United States Patent [19]
Okada et al.

[11] Patent Number: 5,645,296
[45] Date of Patent: Jul. 8, 1997

[54] AIR BAG INFLATION GAS GENERATOR

[75] Inventors: Takeshi Okada; Michio Sioda; Takasi Minamizawa, all of Fukushima-ken, Japan

[73] Assignee: Nippon Koki Co., Ltd., Tokyo, Japan

[21] Appl. No.: 551,679

[22] Filed: Nov. 1, 1995

[51] Int. Cl.[6] ............................................. B60R 21/26
[52] U.S. Cl. ........................................ 280/736; 280/211
[58] Field of Search ............................. 280/736, 741, 280/742

[56] References Cited

U.S. PATENT DOCUMENTS

| | | | |
|---|---|---|---|
| 5,273,311 | 12/1993 | Geisreiter | 280/736 |
| 5,273,722 | 12/1993 | Högenauer et al. | 280/736 |

*Primary Examiner*—Kenneth R. Rice
*Attorney, Agent, or Firm*—Kalish & Gilster

[57] ABSTRACT

This invention relates to an air bag inflation gas generator used to inflate air bags such as air bags for impact safety devices, life jackets, rafts, and escape chutes, and aims to simplify its structure extensively as compared with prior art and to make the device compact easily. Combustion gas produced when gas generating agents are burnt passes through a gas filter which is disposed inside the outer wall of a combustion chamber and flows from gas outlets of the outer wall directly into an air bag. When the combustion gas passes through the gas filter, residues contained in the combustion gas is collected by the gas filter to purify the combustion gas. And, the combustion gas produced when gas generating agents are burnt is changed its passage by gas passage changing means, and the residues contained in the combustion gas are collected between a partition member and the gas passage changing means before the combustion gas enters the gas filter. Then, the combustion gas is purified by the gas filter and goes out of the gas outlets.

29 Claims, 9 Drawing Sheets

AIR BAG INFLATION GAS GENERATOR

BACKGROUND OF THE INVENTION

1. Field of the Invention:

This invention relates to an air bag inflation gas generator used to inflate air bags such as air bags for impact safety devices, life jackets, rafts, and escape chutes.

2. Description of the Related Art:

A prior shock absorber to protect a passenger car driver from shocks at a collision accident comprises an air bag having a capacity of, for example, 60 liters and a gas generator to inflate the air bag with gas. At a collision accident of a passenger car, explosives or other gas generating agents having a similar composition thereto, which are charged in the gas generator, are ignited and burnt to produce gas. The air bag is instantaneously inflated by the resultant gas to protect the driver against any collision shocks, thereby avoiding possible serious injury of the driver.

Figure 14:
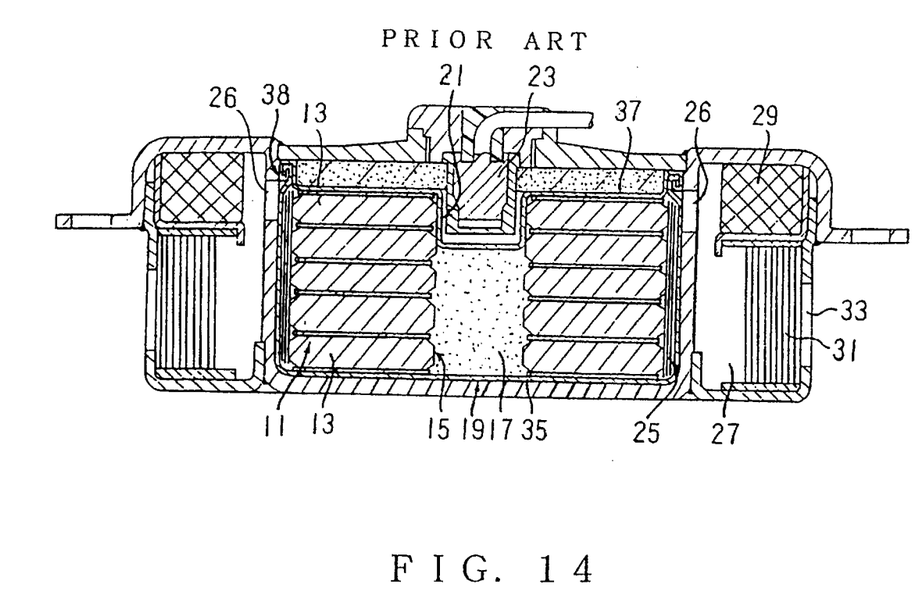
FIG. 14 is a sectional view showing a conventional air bag inflation gas generator.

FIG. 14 shows a prior air bag inflation gas generator disclosed in Japanese Patent Application Laid-open Print No. 155857/1990. In the drawing, the reference numeral 11 shows a combustion chamber containing a plurality of gas generating agents 13 in the stacked state.

The gas generating agent 13 is a circular plate having a through hole 15 at the center, and the through hole 15 accommodates an ignition agent 17.

These gas generating agents 13 are accommodated in a concealed container 19. At the center of this concealed container 19, a concave part 21 is formed to be recessed toward the through hole 15 of the gas generating agents 13.

In the concave part 21 is provided an igniter 23 to burn the gas generating agents 13.

The combustion chamber 11 has a combustion chamber filter 25 disposed along its inner wall. And, a plenum chamber 27 annually surrounds the combustion chamber 11 and receives gas flow through an orifice 26 from the combustion chamber filter 25.

The plenum chamber 27 contains a plenum chamber filter consisting of an upper filter 29 and a gas filter 31.

And, the plenum chamber 27 contains gas outlets 33 to supply the gas flow from the gas filter 31 to an air bag.

In this type of air bag inflation gas generator, the powder in the igniter 23 burns the ignition agent 17 when the igniter is energized. The ignition agent 17 in turn causes the gas generating agents 13 to burn. Gas from the gas generating agents 13 flows into the plenum chamber 27 through the combustion chamber filter 25 disposed along the inner wall of the combustion chamber 11. The gas is then purified by the upper filter 29 and the gas filter 31 and flows into the air bag through the gas outlets 33. The air bag can be completely inflated within a very short time, for example, approximately 0.04 second.

The prior air bag inflation gas generator, however, has drawbacks that the structure is complicated and its size becomes relatively large because the plenum chamber 27 annually surrounds the combustion chamber 11 and contains the plenum chamber filter consisting of the upper filter 29 and the gas filter 31 to remove the residues of the combustion gas by means of the plenum chamber filter.

SUMMARY OF THE INVENTION

This invention has been completed to remedy the aforementioned problems, and its object is to provide an air bag Inflation gas generator which can be simplified extensively as compared with prior art and can be made compact easily.

To accomplish the above object, the invention forms gas outlets to the air bag directly on the outer wall of a combustion chamber which accommodates gas generating agents and disposes an annular gas filter within the outer wall.

This invention forms gas outlets on an outer wall of a combustion chamber accommodating gas generating agents, disposes a gas filter inside the outer wall, and disposes gas passage changing means for changing the passage of the gas from the gas generating agents between the gas outlets and the gas filter.

This invention forms gas outlets on an outer wall of a combustion chamber accommodating gas generating agents, disposes a gas filter inside the outer wall, disposes a partition member having small holes between the gas generating agents and the gas filter, and disposes gas passage changing means, which changes the passage of the gas from the gas generating agents gushing out of the small holes of the partition member, between the partition member and the gas filter.

This invention forms the gas outlets to the air bag directly on the outer wall of the combustion chamber accommodating the gas generating agents, disposes the annular gas filter inside the outer wall, and disposes the gas generating agents next to the inner periphery of the gas filter.

This invention forms the gas outlets to the air bag directly on the outer wall of the combustion chamber accommodating the gas generating agents, disposes the annular gas filter inside the outer wall, and disposes gas passage changing means for changing the passage of the gas from the gas generating agents within the gas filter.

In this invention, the gas passage changing means changes the passage of the gas from the gas generating agents at an angle of 30 to 90 degrees.

In this invention, the gas passage changing means is made of plate-shaped passage changing members, and wound into a filter member.

In this invention, the filter member is made of wire gauze, wire gauze and ceramics paper, or wire gauze and metallic fabrics.

In this invention, the gas passage changing member comprises inner and outer plates which are disposed in a radial direction within the gas filter with a prescribed space therebetween, and the inner and outer plates have gas flow openings formed at different positions respectively.

In this invention, the inner and outer plates have a length enough to make one turn within the gas filter.

In this invention, the outer plate has its gas flow openings formed so as not to align with the gas flow opening of the inner plate.

In this invention, the gas flow openings are rectangular or comprise many small holes.

In this invention, the inner and outer plates are made of one of aluminum, stainless steel and copper.

In this invention, the inner and outer plates have a thickness of 0.1 to 0.5 mm.

In this invention, the combustion gas produced when gas generating agents are burnt is gushed out of the small holes of the partition member, its passage is changed by gas passage changing means, and the residues contained in the combustion gas are collected between the partition member and the gas passage changing means before the combustion gas enters the gas filter. Then, the combustion gas is purified by the gas filter and goes out of the gas outlets.

In this invention, the combustion gas produced when gas generating agents are burnt passes through a gas filter which is disposed inside the outer wall of a combustion chamber and flows from gas outlets of the outer wall directly into an air bag.

And, when the combustion gas passes through the gas filter, residues contained in the combustion gas is collected by the gas filter to purify the combustion gas.

In this invention, the combustion gas produced when gas generating agents which are accommodated next to the inner periphery of a gas filter are burnt passes through the gas filter which is disposed inside the outer wall of a combustion chamber and flows from gas outlets of the outer wall directly into an air bag.

And, when the combustion gas passes through the gas filter, residues contained in the combustion gas is collected by the gas filter to purify the combustion gas.

In this invention, the combustion gas produced when gas generating agents are burnt passes through a gas filter which is disposed inside the outer wall of a combustion chamber and flows from gas outlets of the outer wall directly into an air bag.

And, when the combustion gas passes through the gas filter, its passage is changed by gas passage changing means, and residues contained in the combustion gas is collected by the gas filter to purify the combustion gas.

In this invention, the combustion gas produced when gas generating agents are burnt passes through, for example, a filter member, passes through the gas flow opening of the inner plate, then with its passage changed, passes through the filter member, passes through the gas flow openings of the outer plate, passes through the filter member, and enters the air bag.

In this invention, the inner and outer plates are disposed to make one turn within the gas filter.

In this invention, the outer plate has its gas flow openings formed so as not to align with the gas flow opening of the inner plate, so that the passage of the combustion gas from the inner plate is changed with reliability.

BEST MODE FOR CARRYING OUT THE INVENTION

This invention will be described in detail with reference to the attached drawings.

Figure 1:
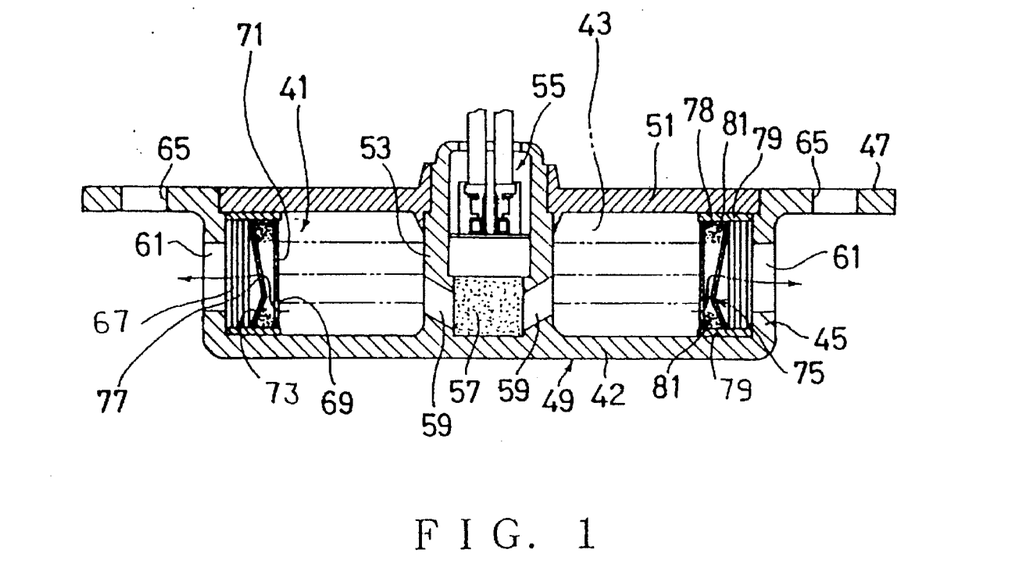
FIG. 1 is a sectional view showing the first embodiment of an air bag inflation gas generator of the invention.
Figure 2:
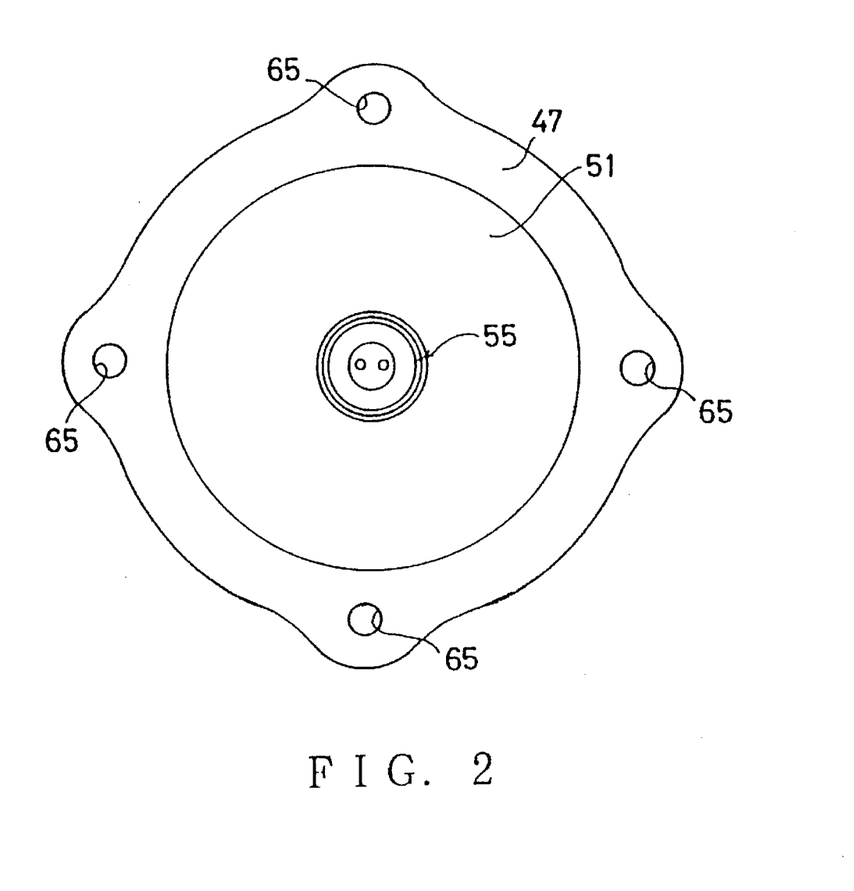
FIG. 2 is a top view of the air bag inflation gas generator of FIG. 1.

FIG. 1 and FIG. 2 show the first embodiment of an air bag inflation gas generator of this invention, and in the drawings, the reference numeral 41 indicates a combustion chamber containing a plurality of gas generating agents 43 in the stacked state.

The combustion chamber 41 consists of a bottom 42, an outer wall 45, a dish-shaped member 49 having a brim 47, and a lid member 51 for covering the opening of the dish-shaped member 49.

The gas generating agents 43 have the shape of annular plates or pellets having a through hole at the center, and a cylinder 53 integrally formed at the center of the bottom 42 of the dish-shaped member 49 is inserted into the through hole.

The cylinder 53 is passed through the center of the lid member 51, an igniter 55 is disposed on the cylinder 53 near the lid member 51, and an ignition agent 57 is positioned between the igniter 55 and the bottom 42.

The cylinder 53 is provided with a plurality of through holes 59.

The outer wall 45 of the dish-shaped member 49 has gas outlets 61, and the brim 47 has mounting holes 65 through which a mounting bolt is fitted.

And, an annular gas filter 67 is disposed along the inside of the outer wall 45.

The gas generating agents 43 are directly housed next to the inner periphery of the gas filter 67.

And, an annular partition member 71 having a number of small holes 69 is disposed between the gas generating agents 43 and the gas filter 67.

In this embodiment, the small holes 69 are formed on the partition member 71 near the bottom 42.

And, a gas passage changing member 73, which changes the passage of the combustion gas from the gas generating agents 43 gushing out of the small holes 69 of the partition member 71, is disposed between the partition member 71 and the gas filter 67.

The gas passage changing member 73 is annular and has a diameter reduction part 75 in front of the small holes 69 of the partition member 71.

And, a large number of gas passage changing small holes 77 are formed on the gas passage changing member 73 on the lid member 51 side above the diameter reduction part 75.

Thus, the gas passage changing small holes 77 are positioned different from the small holes 69 of the partition member 71.

Besides, the gas passage changing member 73 has an inner brim 78 on the lid member 51 side, and the partition member 71, the gas passage changing member 73 and the gas filter 67 are held between a pair of supporting members 79 made of stainless steel, aluminum or the like. These supporting members 79 may be a flame-retarding, elastic packing such as silicone rubber.

With the aforementioned air bag inflation gas generator, the powder in the igniter 55 burns when electricity is sent to the igniter 55, which in turn burns the ignition agent 57, the gas generating agents 43 are burned, and the combustion gas produced from the burnt gas generating agents 43 is gushed out of the small holes 69 of the partition member 71, flows through the gas passage changing small holes 77 of the gas passage changing member 73, is purified by the gas filter 67, and goes out of the gas outlets 61.

In the above air bag inflation gas generator, the combustion gas from the gas generating agents 43 is gushed out of the small holes 69 of the partition member 71, its passage is changed by the gas passage changing member 73, and at this time, residues 81 contained in the combustion gas are collected between the partition member 71 and the gas passage changing member 73, so that the conventionally required plenum chamber and plenum chamber filter can be omitted. Thus, the structure of the gas generator can be simplified extensively as compared with prior art, and the it can be made compact easily.

The partition member 71, the gas passage changing member 73 and the gas filter 67 are designed to be held between the pair of supporting members 79, so that they can be assembled separately. As a result, the assembling steps can be reduced.

Figure 3:
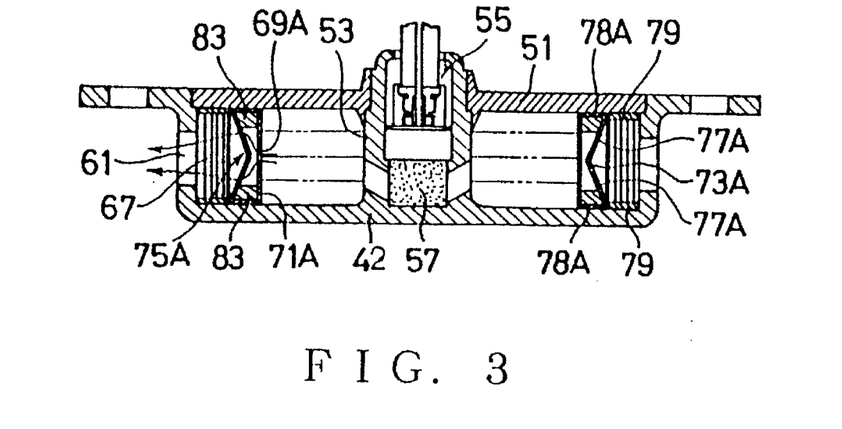
FIG. 3 is a sectional view showing the second embodiment of the air bag inflation gas generator of the invention.

FIG. 3 shows the second embodiment of the invention, in which a partition member 71A has small holes 69A at its center.

A gas passage changing member 73A has a diameter reduction part 75A in front of the small hales 69A of the partition member 71A.

And, gas passage changing small holes 77A are formed above and below the diameter reduction part 75A, thus the gas passage changing small holes 77A are positioned different from the small holes 69A of the partition member 71A.

The gas passage changing member 73A has an inner brim 78A at its either end, and an annular residue collecting filter 83 made of wire gauze is disposed inside the each inner brim 78A.

The air bag inflation gas generator of this embodiment can also have almost the same effects as the first embodiment. Since this embodiment has the residue collecting filter 83 disposed inside the inner brims 78A, the residues contained in the combustion gas can be collected with more reliability.

Figure 4:
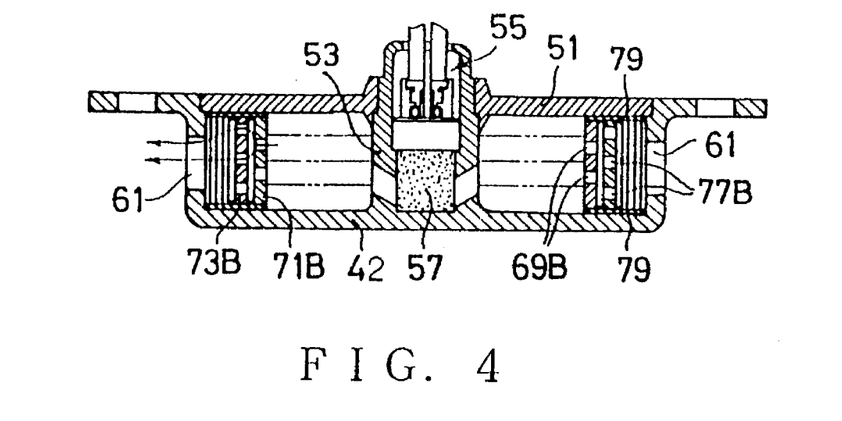
FIG. 4 is a sectional view showing the third embodiment of the air bag inflation gas generator of the invention.

FIG. 4 shows the third embodiment of the invention, in which a partition member 71B has small holes 69B formed at a certain pitch P.

A gas passage changing member 73B also has gas passage changing small holes 77B formed at a certain pitch P.

And, the gas passage changing small holes 77B are positioned with a half pitch displaced from the small holes 69B of the partition member 71B, so that the gas passage changing small holes 77B are not aligned with the small holes 69B of the partition member 71B.

The air bag inflation gas generator of this embodiment can also have almost the same effects as the first embodiment.

Figure 5:
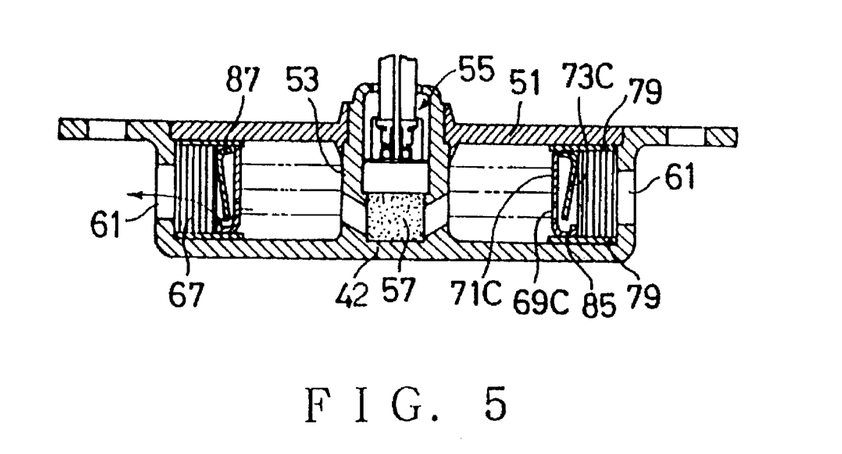
FIG. 5 is a sectional view showing the fourth embodiment of the air bag inflation gas generator of the invention.

FIG. 5 shows the fourth embodiment of the invention, in which a partition member 71C has an outer brim 85 which is protruded outward formed on the bottom 42 side, and the outer brim 85 has its leading end bent inward.

And, small holes 69C are formed near the outer brim 85.

One end of an annular gas passage changing member 73C is positioned to cover the outside of the small holes 69C of the partition member 71C with a prescribed space therebetween, and an inner brim 87 which is formed on the other end is fixed to the partition member 71C by welding or the like.

The air bag inflation gas generator of this embodiment can also have almost the same effects as the first embodiment.

Figure 6:
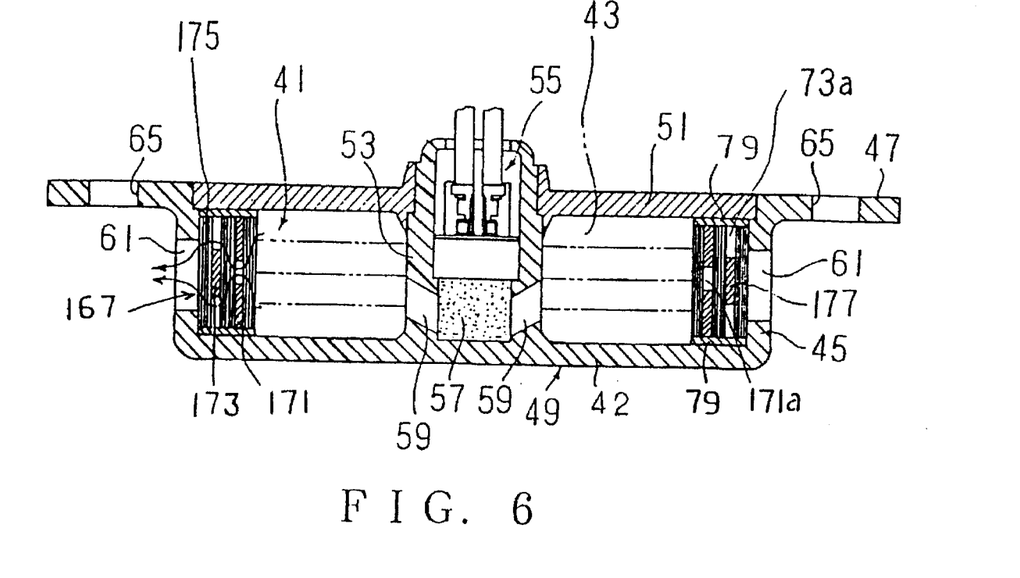
FIG. 6 is a sectional view showing the fifth embodiment of the air bag inflation gas generator of the invention.

FIG. 6 shows the fifth embodiment of the air bag inflation gas generator of the invention, in which gas passage changing means for changing the passage of the combustion gas from the gas generating agents 43 is disposed within a gas filter 167, and changes the passage of the combustion gas from the gas generating agents 43 at an angle in a range of 30 to 90 degrees.

In this embodiment, the gas passage changing means comprises inner and outer plates 171, 173 which are disposed in a radial direction within the gas filter 167 with a prescribed space therebetween. The inner and outer plates 171, 173 have gas flow openings 171a, 173a at different positions respectively.

And, the outer plate 173 has its gas flow openings 173a formed so as not to align with the gas flow opening 171a of the inner plate 171.

Figure 7:
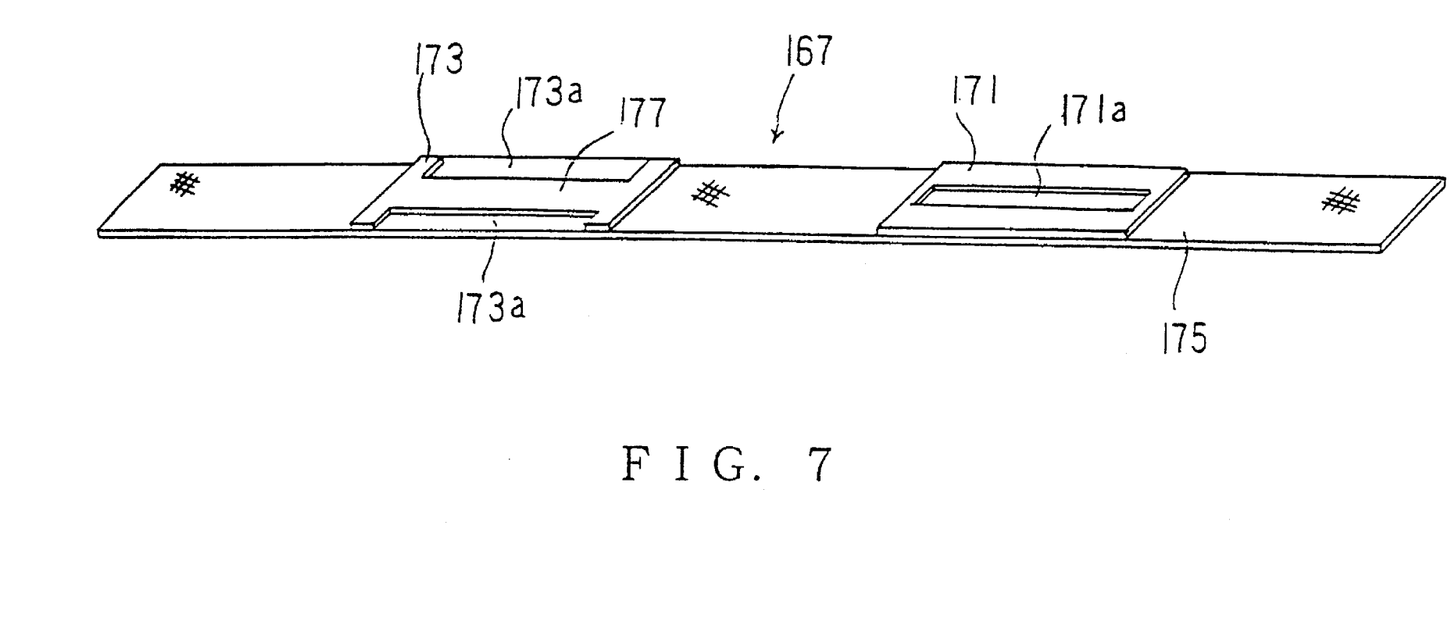
FIG. 7 is an explanatory view showing the gas filter of FIG. 6 in an expanded form.

FIG. 7 shows the gas filter 167 in an expanded form. It is seen that the inner plate 171 and the outer plate 173 are disposed on the inner wall of a filter member 175 with a prescribed distance therebetween.

The inner plate 171 and the outer plate 173 each have a length enough to make one turn within the gas filter 167.

Figure 8:
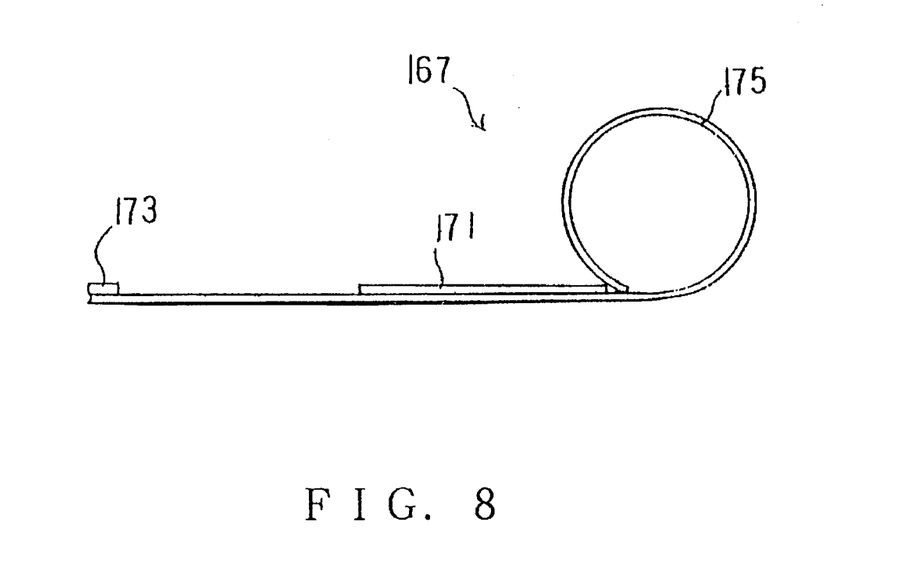
FIG. 8 is an explanatory view showing a winding state of the gas filter of FIG. 7.

As shown in FIG. 8, the filter member 175 shown on the right is wound one turn, the inner plate 171 is wound one turn around the filter member 175, the filter member 175 is wound one turn around the inner plate 171, the outer plate 173 is wound one turn around the filter member 175, and the filter member 175 is wound one turn around the outer plate 173, thereby forming the gas filter 167.

In other words, the gas filter 167 is formed by winding the inner and outer plates 171, 173 into the filter member 175.

The inner plate 171 has the gas flow opening 171a having a rectangular shape at its center, and the outer plate 173 has the gas flow openings 173a having a rectangular shape at its both ends.

A plate 177 formed at the center of the outer plate 173 has an area enough to cover the gas flow opening 171a of the inner plate 171.

In this embodiment, the filter member 175 is made of wire gauze.

The wire gauze is stainless steel, and has a mesh size of Nos. 20 to 50 and a wire diameter of 0.2 to 0.4 mm.

The inner and outer plates 171, 173 are made of any one of aluminum, stainless steel and copper, and have a thickness of 0.1 to 0.5 mm.

With the aforementioned air bag inflation gas generator, the powder in the igniter 55 burns when electricity is sent to the igniter 55, which in turn burns the ignition agent 57, the gas generating agents 43 is burnt, and the combustion gas produced from the burnt gas generating agents 43 is purified by the gas filter 167, and goes out of the gas outlets 61 into an air bag.

In the above air bag inflation gas generator, the combustion gas from the gas generating agents 43 passes through the gas filter 167 which is disposed inside the outer wall 45 of the combustion chamber 41, residues contained in the combustion gas are collected by the gas filter 167 to purify the combustion gas, and the purified combustion gas goes out of the gas outlets 61 of the outer wall 45 directly into the air bag, so that the conventionally required plenum chamber and plenum chamber filter can be omitted. Thus, the structure of the gas generator can be simplified extensively as compared with prior art, and it can be made compact easily.

The gas generating agent 43 can be, for example, a sodium azide-based gas generating agent or a gas generating agent containing less sodium.

When the gas generating agents containing less sodium are used, metal residues are small in quantity, and the metal residues are relatively easily collected by the filter member 175 because the metal residues pass through the filter member 175 in a solid state.

In the conventional air bag inflation gas generator shown in FIG. 14, the combustion chamber filter 25 collects 36% of the residues, the top filter 29 collects 37% of the residues, and the gas filter 31 collects 27% of the residues, while the present invention can collect 100% of the residues by the gas filter 167.

In the aforementioned air bag inflation gas generator of the invention, the gas generating agents 43 are disposed directly next to the inner periphery of the gas filter 167, so that the partition member is not required, the structure can be simplified, and the device can be made compact.

The above air bag inflation gas generator can efficiently collect the residues contained in the combustion gas because the passage of the combustion gas is changed by the gas passage changing means while the combustion gas is passing through the gas filter 167.

More specifically, when the passage of the combustion gas is changed, the metal residues whose specific gravity is larger than the combustion gas are accumulated in the corner, so that the combustion gas only passes through the gas flow openings 171a, 173a, and the metal residues only are left within the filter member 175.

Since the gas passage changing means changes the passage of the combustion gas from the gas generating agents 43 at an angle of 30 to 90 degrees, the residues contained in the combustion gas can be collected more efficiently.

When the changed angle of the passage of the combustion gas is less than 30 degrees, the metal residues and the combustion gas pass through the gas flow openings 171a, 173a without the metal residues collected, and a satisfactory effect cannot be attained. On the other hand, it is hard to change at an angle exceeding 90 degrees in view of the structure.

The passage is preferably changed at an angle of 60 to 90 degrees.

In the above embodiment, since the gas passage changing means is made of the inner and outer plates 171, 173, it can be easily wound into the filter member 175.

Besides, the filter member 175 is made of wire gauze, so that the residues can be collected efficiently.

More specifically, when the wire gauze is wound, the filter member 175 has a three-dimensional structure, and the combustion gas passing through the wire gauze is slightly curved, enabling to collect the metal residues.

The metal residues are cooled and adhered to the surface of the wire gauze because the wire gauze has a high heat capacity.

The above embodiment changes the passage of the combustion gas by the inner and outer plates 171, 173, so that the passage can be changed with high accuracy, and the residues can be collected more efficiently.

Besides, the inner and outer plates 171, 173 are disposed to make a round within the gas filter 167, facilitating the alignment when winding the filter member 175 and the retention of the shape.

In the above embodiment, the outer plate 173 has its gas flow openings 173a formed so as not to align with the gas flow opening 171a of the inner plate 171, so that the passage of the combustion gas from the inner plate 171 is changed with reliability, and the residues can be collected more efficiently.

Furthermore, since the gas flow openings 171a, 173a are simple rectangular, the inner plate 171 is easily aligned with the outer plate 173.

In the aforementioned air bag inflation gas generator, the inner and outer plates 171 and 173 are made of one of aluminum, stainless steel and copper to provide sufficient corrosion resistance.

In addition, the inner and outer plates 171, 173 have a thickness of 0.1 to 0.5 mm, and these plates can be easily wound into the filter member 175.

More specifically, when these plates 171, 173 have a thickness of less than 0.1 mm, they may be fused due to the combustion of the gas generating agents 43, and when they have a thickness exceeding 0.5 mm, their rigidity is increased, making it difficult to wind them into the filter member 175.

Figure 9:
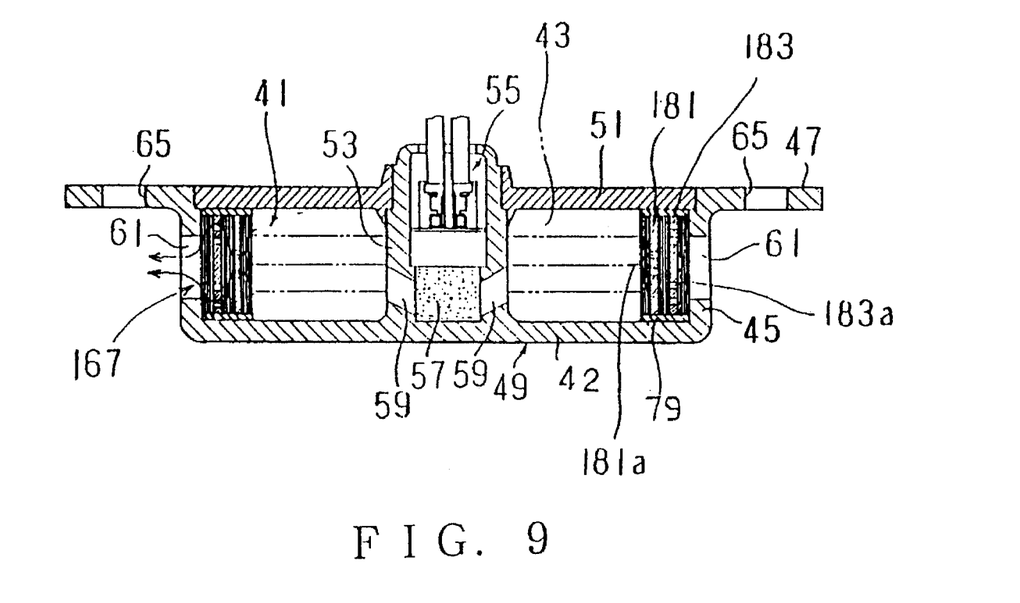
FIG. 9 is a sectional view showing the sixth embodiment of the air bag inflation gas generator of the invention.

The inner and outer plates 171, 173 are preferably 0.1 to 0.2 mm in thickness. FIG. 9 shows the sixth embodiment of the invention, in which an inner plate 181 and an outer plate 183 have gas flow openings 181a, 183b consisting of many small holes.

Figure 10:
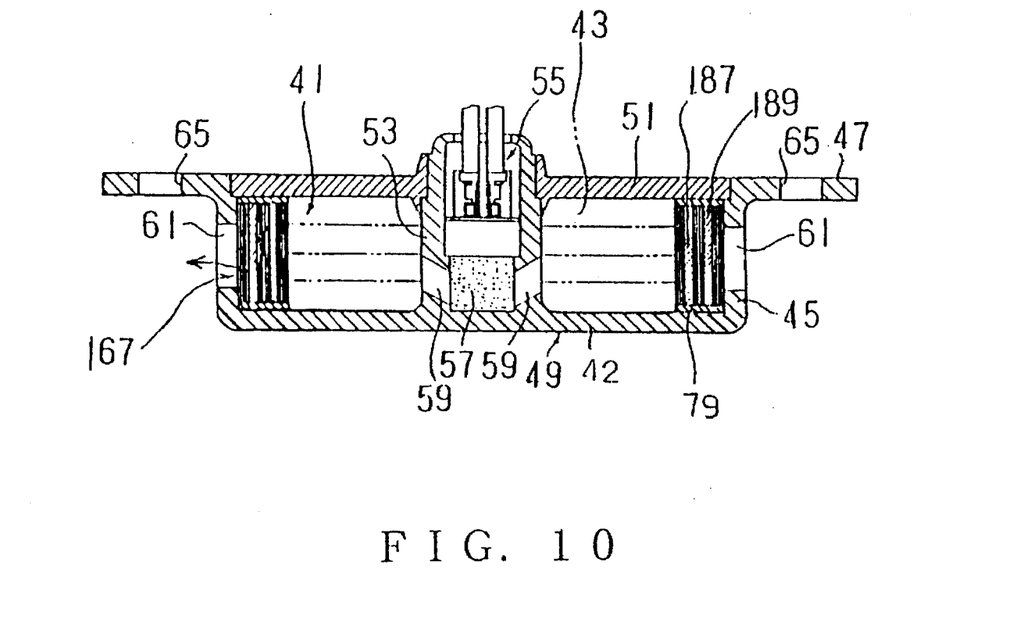
FIG. 10 is an explanatory view showing the gas filter of FIG. 9 in an expanded form.

More specifically, FIG. 10 shows that the inner plate 181 has at its center the gas flow openings 181a which are circular and in the number of 10 to 100, and the outer plate 183 has on its either end the gas flow openings 183a which are circular and in the number of 10 to 100.

And, these gas flow openings 181a, 183a have a diameter of 2 to 5 mm.

The filter member 175 is made of stacked ceramics paper or metallic fabrics 185.

The ceramics paper is woven or non-woven fabric mainly containing alumina and silica.

And, the metallic fabrics are formed by weaving a small-gage wire of stainless steel, iron or the like.

The air bag inflation gas generator of this embodiment can also have almost the same effects as the fifth embodiment And, the gas flow openings 181a, 183a consist of many small holes, so that the combustion gas is dispersed and the residues can be collected more efficiently.

And, the ceramics paper or metallic fabrics 185 enable to collect the residues contained in the combustion gas with more reliability.

Figure 11:
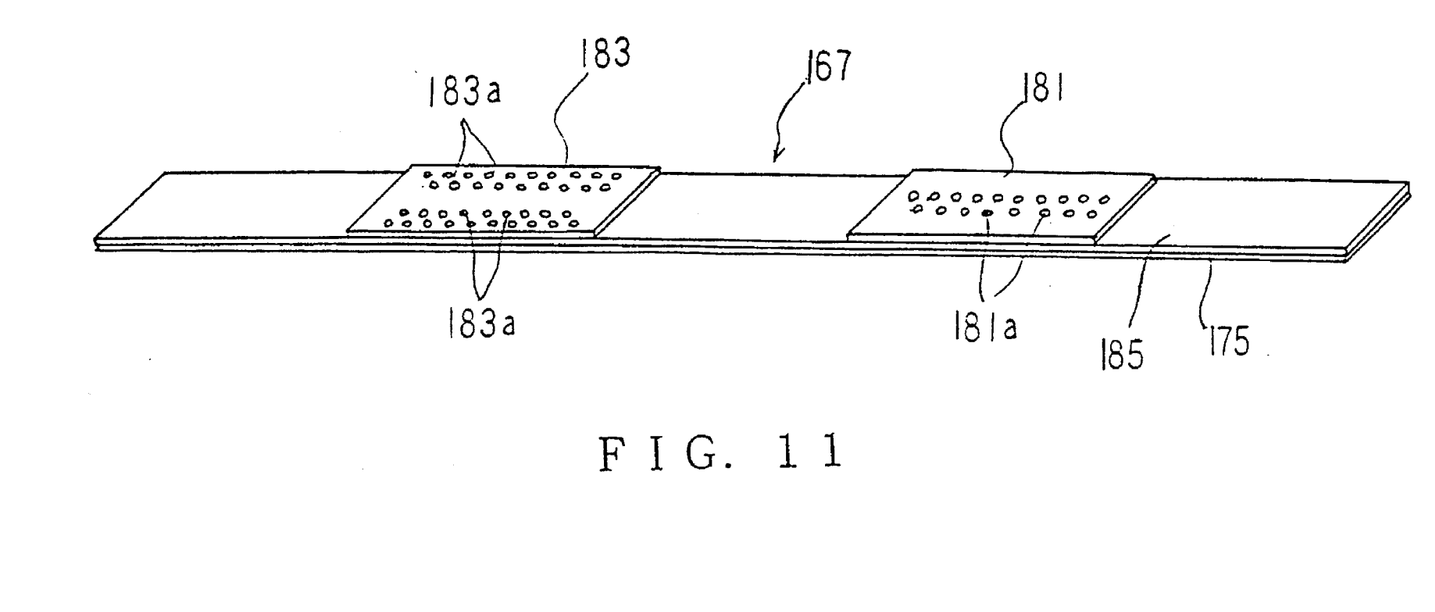
FIG. 11 is a sectional view showing the seventh embodiment of the air bag inflation gas generator of the invention.
Figure 12:
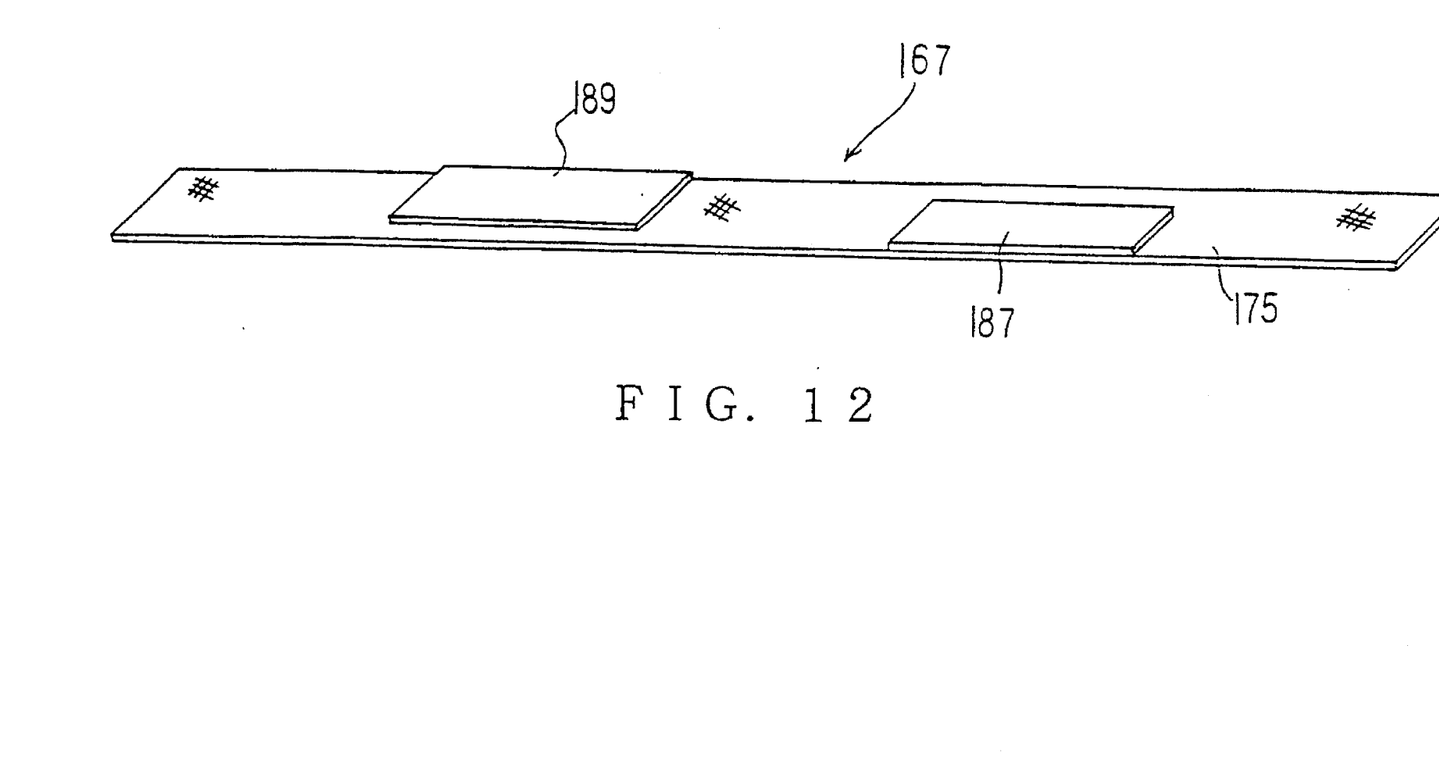
FIG. 12 is an explanatory view showing the gas filter of FIG. 11 in an expanded state.

FIG. 11 shows the seventh embodiment of the invention, in which an inner plate 187 is displaced on one side of the filter member 175 and an outer plate 189 is displaced on the other side of the filter member 175 as shown in FIG. 12.

The air bag inflation gas generator of this embodiment can also have almost the same effects as the fifth embodiment.

Figure 13:
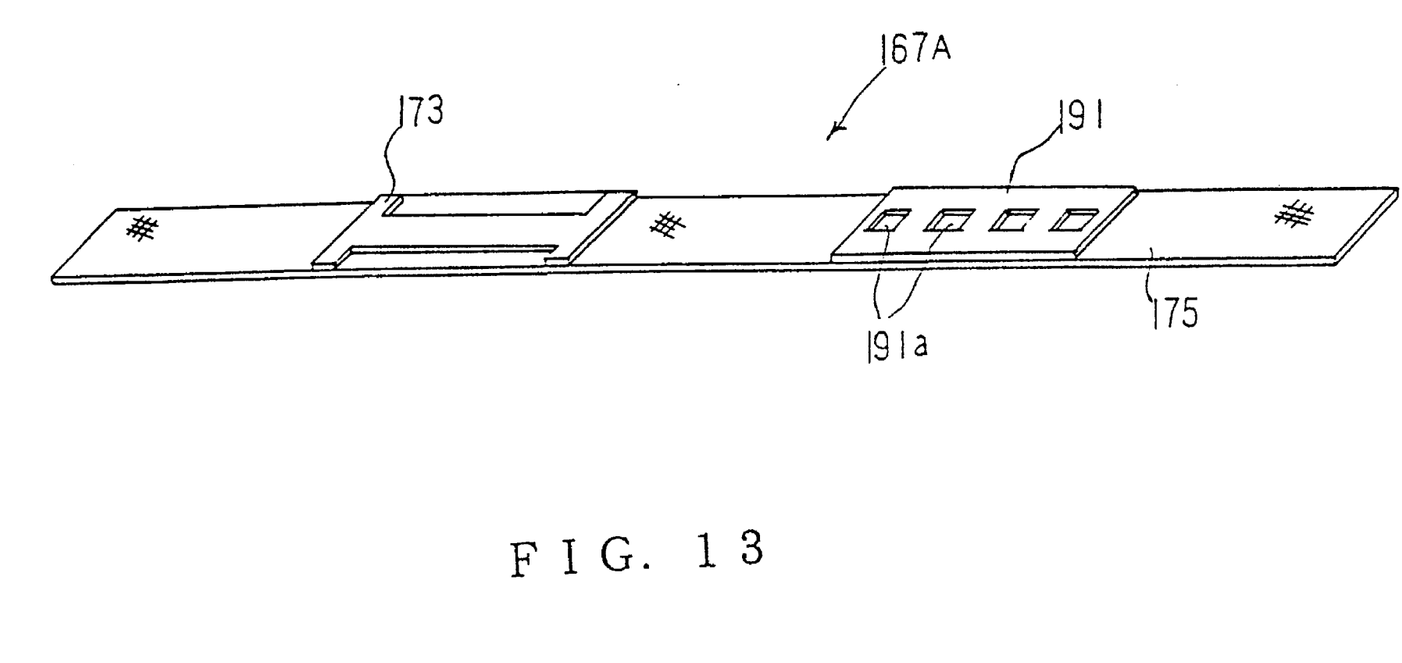
FIG. 13 is an explanatory view of the gas filter in an expanded state of the eighth embodiment of the air bag inflation gas generator of the invention.

FIG. 13 shows the eighth embodiment of the invention with a gas filter 167A in an expanded form. It is seen that an inner plate 191 has a number of rectangular slit openings 191a.

The air bag inflation gas generator of this embodiment can also have almost the same effects as the fifth embodiment.

The above embodiments have been described with reference to the inner and outer plates which are made of any one of aluminum, stainless steel or copper, but the invention is not limited to the above embodiments. The inner and outer plates may be made of iron for example, and it is desirable that the iron is chrome-plated.

INDUSTRIAL APPLICABILITY

As described above, in the air bag inflation gas generator of the invention, the combustion gas is gushed out of the small holes of the partition member, its passage is changed by the gas passage changing means, enabling to omit the conventionally required plenum chamber and plenum chamber filter. As a result, it is advantageous that the structure of the air bag inflation gas generator can be simplified extensively as compared with the prior art, and the device can be made compact easily.

In the air bag inflation gas generator of the invention, the combustion gas produced when the gas generating agents are burnt passes through the gas filter which is disposed inside the outer wall of the combustion chamber, the residues contained in the combustion gas are collected by the gas filter to purify the combustion gas, the purified combustion gas flows from the gas outlets of the outer wall directly into the air bag, so that the conventionally required plenum chamber and plenum chamber filter can be omitted. As a result, it is advantageous that the structure of the air bag inflation gas generator can be simplified extensively as compared with the prior art, and the device can be made compact easily.

And, in the air bag inflation gas generator of the invention, the gas generating agents are disposed directly next to the inner periphery of the gas filter, so that the partition member is not required, the structure can be simplified, and the device can be made compact.

The air bag inflation gas generator of the invention can efficiently collect the residues contained in the combustion gas because the passage of the combustion gas is changed by the gas passage changing means while the combustion gas is passing through the gas filter.

In the air bag inflation gas generator of the invention, since the gas passage changing means changes the passage of the combustion gas from the gas generating agents at an angle of 30 to 90 degrees, the residues contained in the combustion gas can be collected more efficiently.

In the air bag inflation gas generator of the invention, since the passage changing means is made of the plate-shaped passage changing members, it can be easily wound into the filter member.

In the air bag inflation gas generator of the invention, the filter member is made of wire gauze, so that the residues can be collected efficiently.

In the air bag inflation gas generator of the invention, the filter member is made of wire gauze and ceramics paper or wire gauze and metallic fabrics, so that the residues contained in the combustion gas can be collected with more reliability.

In the air bag inflation gas generator of the invention, the passage of the combustion gas is changed by the inner and outer plates, so that the residues can be collected more efficiently.

In the air gas inflation gas generator of the invention, the inner plate and the outer plate each are disposed to make one turn within the gas filter, facilitating the alignment and the retention of the shape.

In the air gas inflation gas generator of the invention, the outer plate has its gas flow openings formed so as not to align with the gas flow opening of the inner plate, so that the passage of the combustion gas from the inner plate is changed with reliability, and the residues can be collected more efficiently.

In the air bag inflation gas generator of the invention, since the gas flow openings are rectangular, the inner plate can be easily aligned with the outer plate.

In the air bag inflation gas generator of the invention, the gas flow openings consist of many small holes, so that the combustion gas is dispersed and the residues can be collected more efficiently.

In the air bag inflation gas generator of the invention, the inner and outer plates are made of one of aluminum, stainless steel and copper to provide sufficient corrosion resistance.

In the air bag inflation gas generator of the invention, the inner and outer plates have a thickness of 0.1 to 0.5 mm, so that it is advantageous that these plates can be easily wound into the filter member.

What is claimed is:

1. An air bag inflation gas generator comprising gas outlets to an air bag which are directly formed on an outer wall of a combustion chamber accommodating gas generating agents, and an annular gas filter which is disposed inside said outer wall.

2. An air bag inflation gas generator according to claim 1, further comprising said gas outlets to said air bag which are directly formed on said outer wall of said combustion chamber accommodating said gas generating agents, and said annular gas filter which is disposed inside said outer wall, said gas generating agents being disposed next to the inner periphery of said gas filter.

3. An air bag inflation gas generator according to claim 2, wherein said gas passage changing means is made of plate-shaped passage changing members, and wound into a filter member.

4. An air bag inflation gas generator according to claim 3 wherein said filter member is made of wire gauze.

5. An air bag inflation gas generator according to claim 3, wherein said filter member is made of wire gauze and ceramics paper or wire gauze and metallic fabrics.

6. An air bag inflation gas generator according to claim 3, wherein said gas flow openings comprise many small holes.

7. An air bag inflation gas generator according to claim 3, wherein said inner and outer plates are made of one of aluminum, stainless steel and copper.

8. An air bag inflation gas generator according to claim 3, wherein said inner and outer plates have a thickness of 0.1 to 0.5 mm.

9. An air bag inflation gas generator comprising gas outlets which are formed on an outer wall of a combustion chamber accommodating gas generating agents, a gas filter which is disposed inside said outer wall, and gas passage changing means for changing the passage of the gas from said gas generating agents, which is disposed between said gas outlets and said gas filter.

10. An air bag inflation gas generator according to claim 9, further comprising said gas outlets to said air bag which are directly formed on said outer wall of said combustion chamber accommodating said gas generating agents, said annular gas filter which is disposed inside said outer wall, and gas passage changing means for changing the passage of the gas from said gas generating agents, said gas passage changing means being disposed within said gas filter.

11. An air bag inflation gas generator according to claim 10, wherein said gas passage changing member comprises inner and outer plates which are disposed in a radial direction within said gas filter with a prescribed space therebetween, and said inner and outer plates have gas flow openings formed at different positions respectively.

12. An air bag inflation gas generator according to claim 11, wherein said inner and outer plates have a length enough to make one turn within said gas filter.

13. An air bag inflation gas generator according to claim 11, wherein said outer plate has its gas flow openings formed so as not to align with the gas flow opening of said inner plate.

14. An air bag inflation gas generator according to claim 11, wherein said gas flow openings are rectangular.

15. An air bag inflation gas generator according to claim 9, wherein said gas passage changing means changes the passage of the gas from said gas generating agents at an angle of 30 to 90 degrees.

16. An air bag inflation gas generator comprising gas outlets which are formed on an outer wall of a combustion chamber accommodating gas generating agents, a gas filter which is disposed inside said outer wall, a partition member having small holes which is disposed between said gas generating agents and said gas filter, and gas passage changing means which changes the passage of the gas from said gas generating agents gushing out of said small holes of said partition member, said gas passage changing means being disposed between said partition member and said gas filter.

17. An air bag inflation gas generator according to claim 16, wherein said gas passage changing means comprises a gas passage changing member which has gas passage changing small holes positioned different from the small holes of said partition member.

18. An air bag inflation gas generator according to claim 16, wherein said gas passage changing means comprises a gas passage changing member which is positioned to cover the gas gushing side of the small holes of said partition member with a prescribed space therebetween.

19. An air bag inflation gas generator according to claim 16, wherein said gas filter, said gas passage changing means and said partition member are held between a pair of supporting members.

20. An air bag inflation gas generator comprising gas outlets to an air bag which are directly formed on an outer wall of a combustion chamber accommodating gas generating agents, and an annular gas filter which is disposed inside said outer wall, said gas generating agents being disposed next to the inner periphery of said gas filter, and gas passage changing means for changing the passage of the gas from said gas generating agents, said gas passage changing means being disposed within said gas filter.

21. An air bag inflation gas generator according to claim 20, wherein said gas passage changing means changes the passage of the gas from said gas generating agents at an angle of 30 to 90 degrees.

22. An air bag according claim 20, wherein said passage changing means is made of plate-shaped passage changing members, and wound into a filter member.

23. An air bag inflation gas generator according to claim 22, wherein said gas flow openings comprise many small holes.

24. An air bag inflation gas generator according to claim 22, wherein said inner and outer plates are made of aluminum, stainless steel or copper.

25. An air bag inflation gas generator according to claim 22, wherein said inner and outer plates have a thickness of 0.1 to 0.5 mm.

26. An air bag inflation gas generator according to claim 20, wherein said gas passage changing member comprises inner and outer plate, which are disposed in a radial direction within said gas filter with a prescribed space therebetween, and said inner and outer plates have gas flow openings formed at different positions respectively.

27. An air bag inflation gas generator according to claim 26, wherein said inner and outer plates have a length enough to mae one turn within said gas filter.

28. An air bag inflation gas generator according to claim 26, wherein said outer plate has its gas flow openings formed so as not to align with the gas flow opening of said inner plate.

29. An air bag inflation gas generator according to claim 26, wherein said gas flow openings are rectangular.

* * * * *